US010807625B2

(12) United States Patent
Shubs, Jr. et al.

(10) Patent No.: US 10,807,625 B2
(45) Date of Patent: Oct. 20, 2020

(54) CONTROL SYSTEM ENABLING REMOTE LOCOMOTIVE CONFIGURATION SETTING

(71) Applicant: PROGRESS RAIL LOCOMOTIVE INC., Lagrange, IL (US)

(72) Inventors: Alexander Shubs, Jr., Chicago, IL (US); David Matthew Roenspies, Elburn, IL (US); James David Seaton, Westmont, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 183 days.

(21) Appl. No.: 16/163,019

(22) Filed: Oct. 17, 2018

(65) Prior Publication Data

US 2019/0106137 A1    Apr. 11, 2019

Related U.S. Application Data

(62) Division of application No. 14/886,621, filed on Oct. 19, 2015, now abandoned.

(51) Int. Cl.
*B61L 27/02* (2006.01)
*B61L 27/00* (2006.01)
(Continued)

(52) U.S. Cl.
CPC .............. *B61L 27/02* (2013.01); *B61L 3/006* (2013.01); *B61L 27/0027* (2013.01);
(Continued)

(58) Field of Classification Search
None
See application file for complete search history.

(56) References Cited

U.S. PATENT DOCUMENTS

| 1,848,903 A | * | 3/1932 | Peiffer et al. | B61L 29/246 |
| | | | | 246/194 |
| 2,120,443 A | * | 6/1938 | Schoepf | B60T 8/324 |
| | | | | 303/131 |

(Continued)

FOREIGN PATENT DOCUMENTS

| GB | 399890 A | * | 10/1933 | ............ H02J 7/1423 |
| GB | 895329 A | * | 5/1962  | ............... B60L 3/02 |

*Primary Examiner* — Shelley Chen
(74) *Attorney, Agent, or Firm* — Finnegan, Henderson, Farabow, Garrett & Dunner, LLP

(57) ABSTRACT

A control system for remotely configuring a locomotive includes a plurality of operational control devices located on-board the locomotive, the plurality of operational control devices being configured to implement a change to a designated configuration of the locomotive. A controller located on-board the locomotive is configured to activate the plurality of operational control devices to change the designated configuration of the locomotive upon receipt of a configuration command signal. An off-board remote user interface located remotely from the locomotive is configured to receive a single input from a user commanding a change in configuration of the locomotive, the single input being implemented by activation of a single input device on the remote user interface, and selectively send a configuration command signal to the on-board controller to activate the plurality of operational control devices to change the designated configuration of the locomotive.

20 Claims, 3 Drawing Sheets

(51) Int. Cl.
   *B61L 3/00* (2006.01)
   *G05D 1/00* (2006.01)
(52) U.S. Cl.
   CPC ....... *B61L 27/0061* (2013.01); *B61L 27/0094* (2013.01); *G05D 1/0011* (2013.01)

(56) References Cited

U.S. PATENT DOCUMENTS

| | | | | |
|---|---|---|---|---|
| 6,314,345 B1* | 11/2001 | Coombes | ................ | B61L 3/127 104/305 |
| 6,401,015 B1* | 6/2002 | Stewart | ................ | B60T 13/665 303/7 |
| 7,520,472 B2* | 4/2009 | Peltz | ................ | B61L 3/127 246/182 B |
| 8,013,550 B1* | 9/2011 | Young | ................ | A63H 19/24 246/187 A |
| 8,030,871 B1* | 10/2011 | Young | ................ | A63H 19/24 246/187 R |
| 8,154,227 B1* | 4/2012 | Young | ................ | A63H 30/04 318/255 |
| 8,502,483 B2* | 8/2013 | Young | ................ | A63H 19/24 318/255 |
| 2002/0027495 A1* | 3/2002 | Darby, Jr. | ................ | H04L 1/188 340/298 |
| 2005/0253022 A1* | 11/2005 | Peltz | ................ | B61L 3/127 246/187 A |
| 2006/0129289 A1* | 6/2006 | Kumar | ................ | B61L 27/0094 105/26.05 |
| 2007/0137514 A1* | 6/2007 | Kumar | ................ | F02D 41/0025 105/26.05 |
| 2012/0078442 A1* | 3/2012 | Young | ................ | A63H 19/24 701/2 |
| 2012/0239228 A1* | 9/2012 | Vos | ................ | F01D 15/02 701/3 |
| 2013/0079959 A1* | 3/2013 | Swanson | ................ | B61C 17/12 701/19 |
| 2013/0311014 A1* | 11/2013 | Matusiak | ................ | B61C 17/12 701/20 |
| 2016/0060833 A1* | 3/2016 | Shubs, Jr. | ................ | E01H 8/10 37/197 |
| 2016/0229432 A1* | 8/2016 | Kellner | ................ | B61L 15/0027 |

* cited by examiner

FIG. 2

CONTROL SYSTEM ENABLING REMOTE LOCOMOTIVE CONFIGURATION SETTING

CROSS-REFERENCE TO RELATED APPLICATION

This application is a divisional of U.S. application Ser. No. 14/886,621, filed Oct. 19, 2015, which is hereby incorporated by reference in its entirety.

TECHNICAL FIELD

The present disclosure relates generally to a control system for use in remotely controlling locomotives and, more particularly, to a control system for remotely setting a designated configuration of the locomotives.

BACKGROUND

Rail vehicles may include multiple powered units, such as locomotives, that are mechanically coupled or linked together in a consist. The consist of powered units operates to provide tractive and/or braking efforts to propel and stop movement of the rail vehicle. The powered units in the consist may change the supplied tractive and/or braking efforts based on a data message that is communicated to the powered units. For example, the supplied tractive and/or braking efforts may be based on Positive Train Control (PTC) instructions or control information for an upcoming trip. The control information may be used by a software application to determine the speed or other operational parameters of the rail vehicle for various segments of an upcoming trip of the rail vehicle.

A goal in the operation of the locomotives in a train is to eliminate the need for an operator on-board the train. In order to achieve the goal of providing automatic train operation (ATO), a reliable control system and user interface must be provided in order to transmit train control commands and other data indicative of operational characteristics associated with various subsystems of the locomotive consists between the train and an off-board, remote user interface (sometimes located at a "back office" or other off-board locations). The control system must be capable of transmitting data messages having the information used to control the tractive and/or braking efforts of the rail vehicle and the operational characteristics of the various consist subsystems while the rail vehicle is moving. The control system must also be able to transmit information regarding a detected fault on-board a locomotive, and respond with control commands to reset the fault.

One example of a train that includes a control system that allows the transfer of control commands from a lead locomotive to a remote locomotive is disclosed in U.S. Pat. No. 8,364,338 of Peltonen et al. that issued on Jan. 29, 2013 ("the '338 patent"). In particular, the '338 patent discloses a system and method for remotely administering a fault detected on an unmanned powered system that is controlled through a lead powered system. The method includes detecting an operational fault on an unmanned powered system, communicating information about the fault to the lead powered system through a wireless communication protocol, and communicating a reset message to the unmanned powered system.

Although useful in allowing for control of an unmanned remote trailing locomotive in a train by wireless signals sent from a lead locomotive of the train, the system of the '338 patent may be limited. In particular, the '338 patent does not provide a way for a remote operator at a back office or other remote user interface, or a third party located remotely and with access only to an Internet-connected terminal, to receive information on the status of a locomotive and send commands to the locomotive from the remote user interface or remote, Internet-connected terminal.

The present disclosure is directed at overcoming one or more of the shortcomings set forth above and/or other problems of the prior art.

SUMMARY

In one aspect, the present disclosure is directed to a control system for remotely configuring a locomotive. The control system may include a plurality of operational control devices located on-board the locomotive, the plurality of operational control devices being configured to implement a change to a designated configuration of the locomotive. An on-board controller located on-board the locomotive may be configured to activate the plurality of operational control devices to change the designated configuration of the locomotive upon receipt of a configuration command signal. An off-board remote user interface located remotely from the locomotive may be configured to receive a single input from a user commanding a change in configuration of the locomotive, the single input being implemented by activation of a single input device on the remote user interface, and selectively send a configuration command signal to the on-board controller to activate the plurality of operational control devices to change the designated configuration of the locomotive.

In another aspect, the present disclosure is directed to a train control system, wherein the train comprises at least a lead consist of locomotives including at least a lead locomotive and a trailing locomotive, and a trailing consist of locomotives including at least a lead locomotive and a trailing locomotive. The control system may include a plurality of operational control devices located on-board at least one of the locomotives, wherein the plurality of operational control devices may be configured to change a configuration setting for the at least one locomotive when the at least one locomotive is ready for travel. An on-board controller located on-board the at least one locomotive may be configured to switch the plurality of operational control devices upon receipt of a single configuration command signal to at least one of set the at least one locomotive into a run configuration, change the designation for the at least one locomotive between lead and trailing designations, and change distributed power control for the at least one locomotive between distributed power lead, remote distributed power lead, and unlinked power. Setting the at least one locomotive into a run configuration, changing the designation of the at least one locomotive, and changing distributed power control each include changing multiple operational control settings as a result of the single configuration command signal, wherein the multiple settings that are changed include at least two of a fuel control setting, a traction control setting, a generator setting, a setting of an automatic brake handle, a setting of an independent brake handle, a setting of an electrically controlled pneumatic brake, and a setting of an equalizing reservoir pressure for air brakes. An off-board remote user interface located remotely from the train may be configured to send the single configuration command signal upon activation of a single input on the remote user interface.

In yet another aspect, the present disclosure is directed to a method of configuring a locomotive. The method may include selectively configuring a plurality of operational control devices located on-board the locomotive to change a configuration setting for the locomotive when the locomotive is ready for travel. The method may include selectively configuring the plurality of operational control devices upon receipt of a single configuration command signal by an on-board controller located on-board the locomotive, wherein the plurality of operational control devices may be switched by the single configuration command signal to at least one of set the locomotive into a run configuration, change the designation for the locomotive between lead and trailing designations, and change distributed power control for the locomotive between distributed power lead, remote distributed power lead, and unlinked power. Setting the at least one locomotive into a run configuration, changing the designation of the at least one locomotive, and changing distributed power control each include changing multiple operational control settings as a result of the single configuration command signal, wherein the multiple settings that are changed include at least two of a fuel control setting, a traction control setting, a generator setting, a setting of an automatic brake handle, a setting of an independent brake handle, a setting of an electrically controlled pneumatic brake, and a setting of an equalizing reservoir pressure for air brakes. The method may further include sending the single configuration command signal from an off-board remote user interface located remotely from the locomotive upon activation of a single input on the remote user interface.

BRIEF DESCRIPTION OF THE DRAWING

FIG. 2 is a an exemplary GUI for a remote user interface that may be used with the control system of FIG. 1.

DETAILED DESCRIPTION

Figure 1:
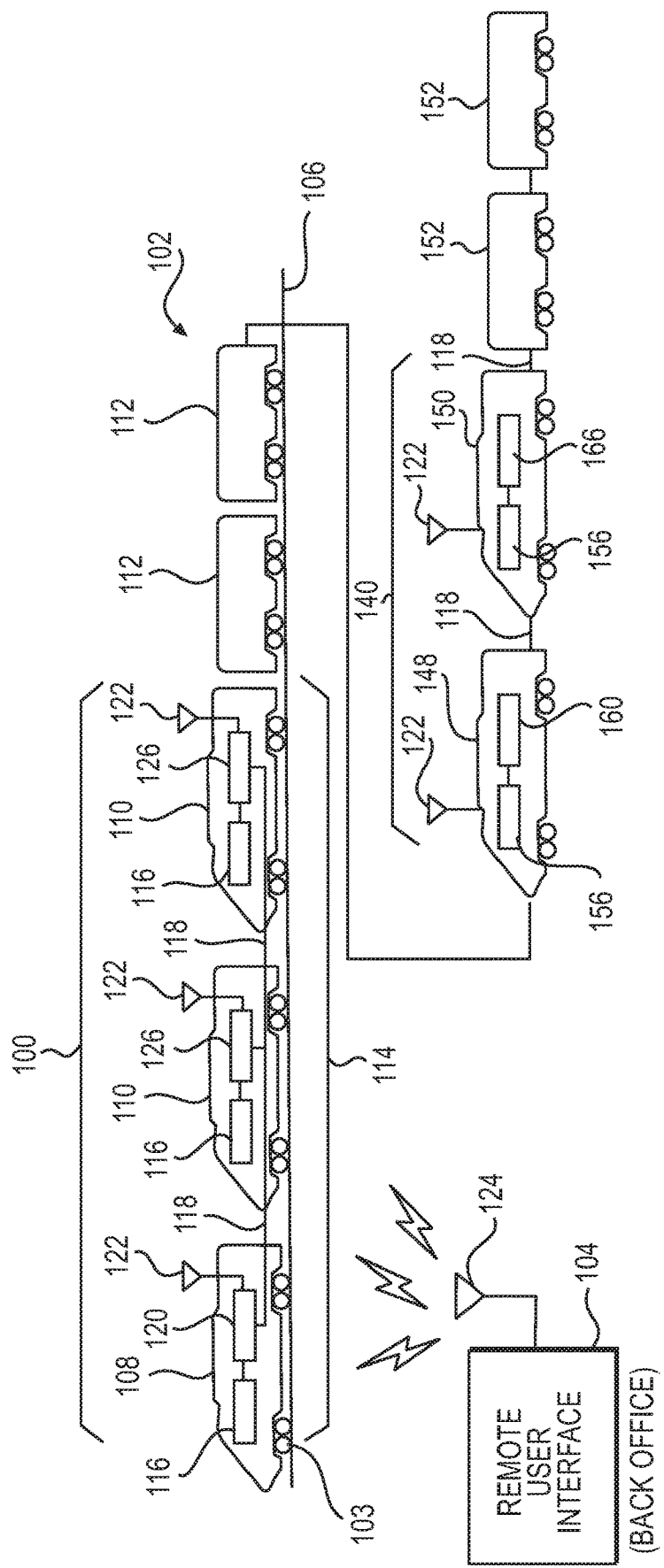
FIG. 1 is a schematic diagram of one embodiment of a control system for a train.

FIG. 1 is a schematic diagram of one embodiment of a control system 100 for operating a train 102 traveling along a track 106. The train may include multiple rail cars (including powered and/or non-powered rail cars or units) linked together as one or more consists or a single rail car (a powered or non-powered rail car or unit). The control system 100 may provide for cost savings, improved safety, increased reliability, operational flexibility, and convenience in the control of the train 102 through communication of network data between an off-board remote user interface 104 and the train 102. The control system 100 may also provide a means for remote operators or third party operators to communicate with the various locomotives or other powered units of the train 102 from remote interfaces that may include any computing device connected to the Internet or other wide area or local communications network. The control system 100 may be used to convey a variety of network data and command and control signals in the form of messages communicated to the train 102, such as packetized data or information that is communicated in data packets, from the off-board remote user interface 104. The off-board remote user interface 104 may also be configured to receive remote alerts and other data from a controller on-board the train, and forward those alerts and data to desired parties via pagers, mobile telephone, email, and online screen alerts. The data communicated between the train 102 and the off-board remote user interface 104 may include signals indicative of various operational parameters associated with components and subsystems of the train. The data may also include command and control signals operative to change the designation of one or more locomotives in the train from a lead designation to a trailing designation, change a distributed power control status for the train, and change the state of various circuit breakers, throttles, brake controls, actuators, switches, handles, relays, and other electronically-controllable devices on-board any locomotive or other powered unit of the train 102.

The off-board remote user interface 104 may be connected with an antenna module 124 configured as a wireless transmitter or transceiver to wirelessly transmit data messages to the train 102. The messages may originate elsewhere, such as in a rail-yard back office system, one or more remotely located servers (such as in the "cloud"), a third party server, a computer disposed in a rail yard tower, and the like, and be communicated to the off-board remote user interface 104 by wired and/or wireless connections. Alternatively, the off-board remote user interface 104 may be a satellite that transmits the message down to the train 102, or a cellular tower disposed remote from the train 102 and the track 106. Other devices may be used as the off-board remote user interface 104 to wirelessly transmit the messages. For example, other wayside equipment, base stations, or back office servers may be used as the off-board remote user interface 104. By way of example only, the off-board remote user interface 104 may use one or more of the Transmission Control Protocol (TCP), Internet Protocol (IP), TCP/IP, User Datagram Protocol (UDP), or Internet Control Message Protocol (ICMP) to communicate network data over the Internet with the train 102. As described below, the network data can include information used to automatically and/or remotely control operations of the train 102 or subsystems of the train, and/or reference information stored and used by the train 102 during operation of the train 102. The network data communicated to the off-board remote user interface 104 from the train 102 may also provide alerts and other operational information that allows for remote monitoring, diagnostics, asset management, and tracking of the state of health of all of the primary power systems and auxiliary subsystems such as HVAC, air brakes, lights, event recorders, and the like.

The train 102 may include a lead consist 114 of powered locomotives, including the interconnected powered units 108 and 110, one or more remote or trailing consists 140 of powered locomotives, including powered units 148, 150, and additional non-powered units 112, 152. "Powered units" refers to rail cars that are capable of self-propulsion, such as locomotives. "Non-powered units" refers to rail cars that are incapable of self-propulsion, but which may otherwise receive electric power for other services. For example, freight cars, passenger cars, and other types of rail cars that do not propel themselves may be "non-powered units", even though the cars may receive electric power for cooling, heating, communications, lighting, and other auxiliary functions.

In the illustrated embodiment of FIG. 1, the powered units 108, 110 represent locomotives joined with each other in the lead consist 114. The lead consist 114 represents a group of two or more locomotives in the train 102 that are mechanically coupled or linked together to travel along a route. The lead consist 114 may be a subset of the train 102 such that the lead consist 114 is included in the train 102 along with additional trailing consists of locomotives, such as trailing consist 140, and additional non-powered units 152, such as freight cars or passenger cars. While the train 102 in FIG. 1 is shown with a lead consist 114, and a trailing consist 140, alternatively the train 102 may include other numbers of locomotive consists joined together or interconnected by one or more intermediate powered or non-powered units that do not form part of the lead and trailing locomotive consists.

The powered units 108, 110 of the lead consist 114 include a lead powered unit 108, such as a lead locomotive, and one or more trailing powered units 110, such as trailing locomotives. As used herein, the terms "lead" and "trailing" are designations of different powered units, and do not necessarily reflect positioning of the powered units 108, 110 in the train 102 or the lead consist 114. For example, a lead powered unit may be disposed between two trailing powered units. Alternatively, the term "lead" may refer to the first powered unit in the train 102, the first powered unit in the lead consist 114, and the first powered unit in the trailing consist 140. The term "trailing" powered units may refer to powered units positioned after a lead powered unit. In another embodiment, the term "lead" refers to a powered unit that is designated for primary control of the lead consist 114 and/or the trailing consist 140, and "trailing" refers to powered units that are under at least partial control of a lead powered unit.

The powered units 108, 110 include a connection at each end of the powered unit 108, 110 to couple propulsion subsystems 116 of the powered units 108, 110 such that the powered units 108, 110 in the lead consist 114 function together as a single tractive unit. The propulsion subsystems 116 may include electric and/or mechanical devices and components, such as diesel engines, electric generators, and traction motors, used to provide tractive effort that propels the powered units 108, 110 and braking effort that slows the powered units 108, 110.

Similar to the lead consist 114, the embodiment shown in FIG. 1 also includes the trailing consist 140, including a lead powered unit 148 and a trailing powered unit 150. The trailing consist 140 may be located at a rear end of the train 102, or at some intermediate point along the train 102. Non-powered units 112 may separate the lead consist 114 from the trailing consist 140, and additional non-powered units 152 may be pulled behind the trailing consist 140.

The propulsion subsystems 116 of the powered units 108, 110 in the lead consist 114 may be connected and communicatively coupled with each other by a network connection 118. In one embodiment, the network connection 118 includes a net port and jumper cable that extends along the train 102 and between the powered units 108, 110. The network connection 118 may be a cable that includes twenty seven pins on each end that is referred to as a multiple unit cable, or MU cable. Alternatively, a different wire, cable, or bus, or other communication medium, may be used as the network connection 118. For example, the network connection 118 may represent an Electrically Controlled Pneumatic Brake line (ECPB), a fiber optic cable, or wireless connection. Similarly, the propulsion subsystems 156 of the powered units 148, 150 in the trailing consist 140 may be connected and communicatively coupled to each other by the network connection 118, such as a MU cable extending between the powered units 148, 150.

The network connection 118 may include several channels over which network data is communicated. Each channel may represent a different pathway for the network data to be communicated. For example, different channels may be associated with different wires or busses of a multi-wire or multi-bus cable. Alternatively, the different channels may represent different frequencies or ranges of frequencies over which the network data is transmitted.

The powered units 108, 110 may include communication units 120, 126 configured to communicate information used in the control operations of various components and subsystems, such as the propulsion subsystems 116 of the powered units 108, 110. The communication unit 120 disposed in the lead powered unit 108 may be referred to as a lead communication unit. As described below, the lead communication unit 120 may be the unit that initiates the transmission of data packets forming a message to the off-board, remote user interface 104. For example, the lead communication unit 120 may transmit a message via a WiFi or cellular modem to the off-board remote user interface 104. The message may contain information on an operational state of the lead powered unit 108, such as a throttle setting, a brake setting, readiness for dynamic braking, the tripping of a circuit breaker on-board the lead powered unit, or other operational characteristics. The communication units 126 may be disposed in different trailing powered units 110 and may be referred to as trailing communication units. Alternatively, one or more of the communication units 120, 126 may be disposed outside of the corresponding powered units 108, 110, such as in a nearby or adjacent non-powered unit 112. Another lead communication unit 160 may be disposed in the lead powered unit 148 of the trailing consist 140. The lead communication unit 160 of the trailing consist 140 may be a unit that receives data packets forming a message transmitted by the off-board, remote user interface 104. For example, the lead communication unit 160 of the trailing consist 140 may receive a message from the off-board remote user interface 104 providing operational commands that are based upon the information transmitted to the off-board remote user interface 104 via the lead communication unit 120 of the lead powered unit 108 of the lead consist 114. A trailing communication unit 166 may be disposed in a trailing powered unit 150 of the trailing consist 140, and interconnected with the lead communication unit 160 via the network connection 118.

The communication units 120, 126 in the lead consist 114, and the communication units 160, 166 in the trailing consist 140 may be connected with the network connection 118 such that all of the communication units for each consist are communicatively coupled with each other by the network connection 118 and linked together in a computer network. Alternatively, the communication units may be linked by another wire, cable, or bus, or be linked by one or more wireless connections.

The networked communication units 120, 126, 160, 166 may include antenna modules 122. The antenna modules 122 may represent separate individual antenna modules or sets of antenna modules disposed at different locations along the train 102. For example, an antenna module 122 may represent a single wireless receiving device, such as a single 220 MHz TDMA antenna module, a single cellular modem, a single wireless local area network (WLAN) antenna module (such as a "Wi-Fi" antenna module capable of communicating using one or more of the IEEE 802.11 standards or another standard), a single WiMax (Worldwide Interoperability for Microwave Access) antenna module, a single satellite antenna module (or a device capable of wirelessly receiving a data message from an orbiting satellite), a single 3G antenna module, a single 4G antenna module, and the like. As another example, an antenna module 122 may represent a set or array of antenna modules, such as multiple antenna modules having one or more TDMA antenna modules, cellular modems, Wi-Fi antenna modules, WiMax antenna modules, satellite antenna modules, 3G antenna modules, and/or 4G antenna modules.

As shown in FIG. 1, the antenna modules 122 may be disposed at spaced apart locations along the length of the train 102. For example, the single or sets of antenna modules represented by each antenna module 122 may be separated from each other along the length of the train 102 such that each single antenna module or antenna module set is disposed on a different powered or non-powered unit 108, 110, 112, 148, 150, 152 of the train 102. The antenna modules 122 may be configured to send data to and receive data from the off-board remote user interface 104. For example, the off-board remote user interface 104 may include an antenna module 124 that wirelessly communicates the network data from a remote location that is off of the track 106 to the train 102 via one or more of the antenna modules 122. Alternatively, the antenna modules 122 may be connectors or other components that engage a pathway over which network data is communicated, such as through an Ethernet connection.

The diverse antenna modules 122 enable the train 102 to receive the network data transmitted by the off-board remote user interface 104 at multiple locations along the train 102. Increasing the number of locations where the network data can be received by the train 102 may increase the probability that all, or a substantial portion, of a message conveyed by the network data is received by the train 102. For example, if some antenna modules 122 are temporarily blocked or otherwise unable to receive the network data as the train 102 is moving relative to the off-board remote user interface 104, other antenna modules 122 that are not blocked and are able to receive the network data may receive the network data. An antenna module 122 receiving data and command control signals from the off-board device 104 may in turn re-transmit that received data and signals to the appropriate lead communication unit 120 of the lead locomotive consist 114, or the lead communication unit 160 of the trailing locomotive consist 140. Any data packet of information received from the off-board remote user interface 104 may include header information or other means of identifying which locomotive in which locomotive consist the information is intended for. Although the lead communication unit 120 on the lead consist may be the unit that initiates the transmission of data packets forming a message to the off-board, remote user interface 104, all of the lead and trailing communication units may be configured to receive and transmit data packets forming messages. Accordingly, in various alternative implementations according to this disclosure, a command control signal providing operational commands for the lead and trailing locomotives may originate at the remote user interface 104 rather than at the lead powered unit 108 of the lead consist 114. The lead communication units 120, 160, and trailing communication units 126, 166 may also be reconfigurable by commands received from the remote user interface 104, such that any one of the communication units may be switched between lead and trailing status.

Each locomotive or powered unit of the train 102 may include a car body supported at opposing ends by a plurality of trucks. Each truck may be configured to engage the track 106 via a plurality of wheels, and to support a frame of the car body. One or more traction motors may be associated with one or all wheels of a particular truck, and any number of engines and generators may be mounted to the frame within the car body to make up the propulsion subsystems 116, 156 on each of the powered units. The propulsion subsystems 116, 156 of each of the powered units may be further interconnected throughout the train 102 along one or more high voltage power cables in a power sharing arrangement. Energy storage devices (not shown) may also be included for short term or long term storage of energy generated by the propulsion subsystems or by the traction motors when the traction motors are operated in a dynamic braking or generating mode. Energy storage devices may include batteries, ultra-capacitors, flywheels, fluid accumulators, and other energy storage devices with capabilities to store large amounts of energy rapidly for short periods of time, or more slowly for longer periods of time, depending on the needs at any particular time. The DC or AC power provided from the propulsion subsystems 116, 156 or energy storage devices along the power cable may drive AC or DC traction motors to propel the wheels. Each of the traction motors may also be operated in a dynamic braking mode as a generator of electric power that may be provided back to the power cables and/or energy storage devices. Control over engine operation (e.g., starting, stopping, fueling, exhaust aftertreatment, etc.) and traction motor operation, as well as other locomotive controls, may be provided by way of various controls housed within a cab supported by the frame of the train 102. In some implementations of this disclosure, initiation of these controls may be implemented in the cab of the lead powered unit 108 in the lead consist 114 of the train 102. In other alternative implementations, initiation of operational controls may be implemented off-board at the remote user interface 104, or at a powered unit of a trailing consist.

Figure 2:
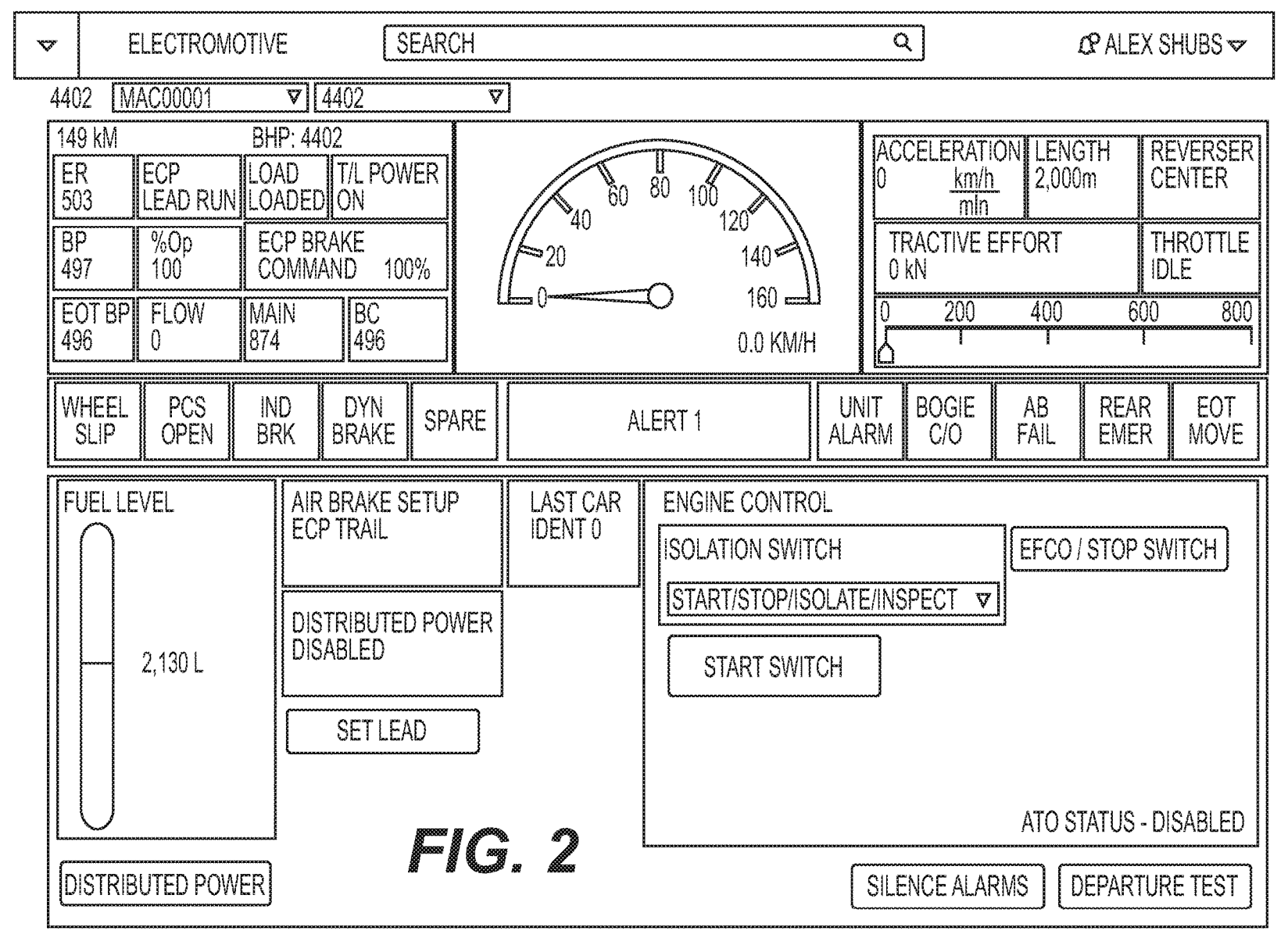

As shown in FIG. 2, an exemplary remote user interface 104 may include a graphical user interface (GUI), or display, which may include various indicators and user input icons or buttons configured to provide operational information to a user and receive input commands from a user. Although the user interface is described as being a remote user interface, one of ordinary skill in the art will recognize that the user interface may also be located onboard any lead or trailing locomotive in the train 102. The remote user interface 104 may include buttons such as the "Set Lead" button illustrated in FIG. 2, which may allow a user at a remote site to change the designation of a trailing locomotive, such as the trailing powered unit 110 in the lead consist 114, to the lead powered unit. As a result, activation of the "Set Lead" control for a particular powered unit may also automatically result in the current lead powered unit being switched to a trailing unit designation. Additional controls that may be performed by a user at the remote user interface may include switching to, or disabling distributed power control; putting a locomotive into an isolated mode, automatic start/stop mode, or inspection mode; or establishing or disabling automatic train operation (ATO). The remote user interface may also be configured to display various operational parameters based on signals received from sensors located at the propulsion subsystems, traction motors, fuel controls, and other sources of operational and diagnostic data at the powered units.

Figure 3:
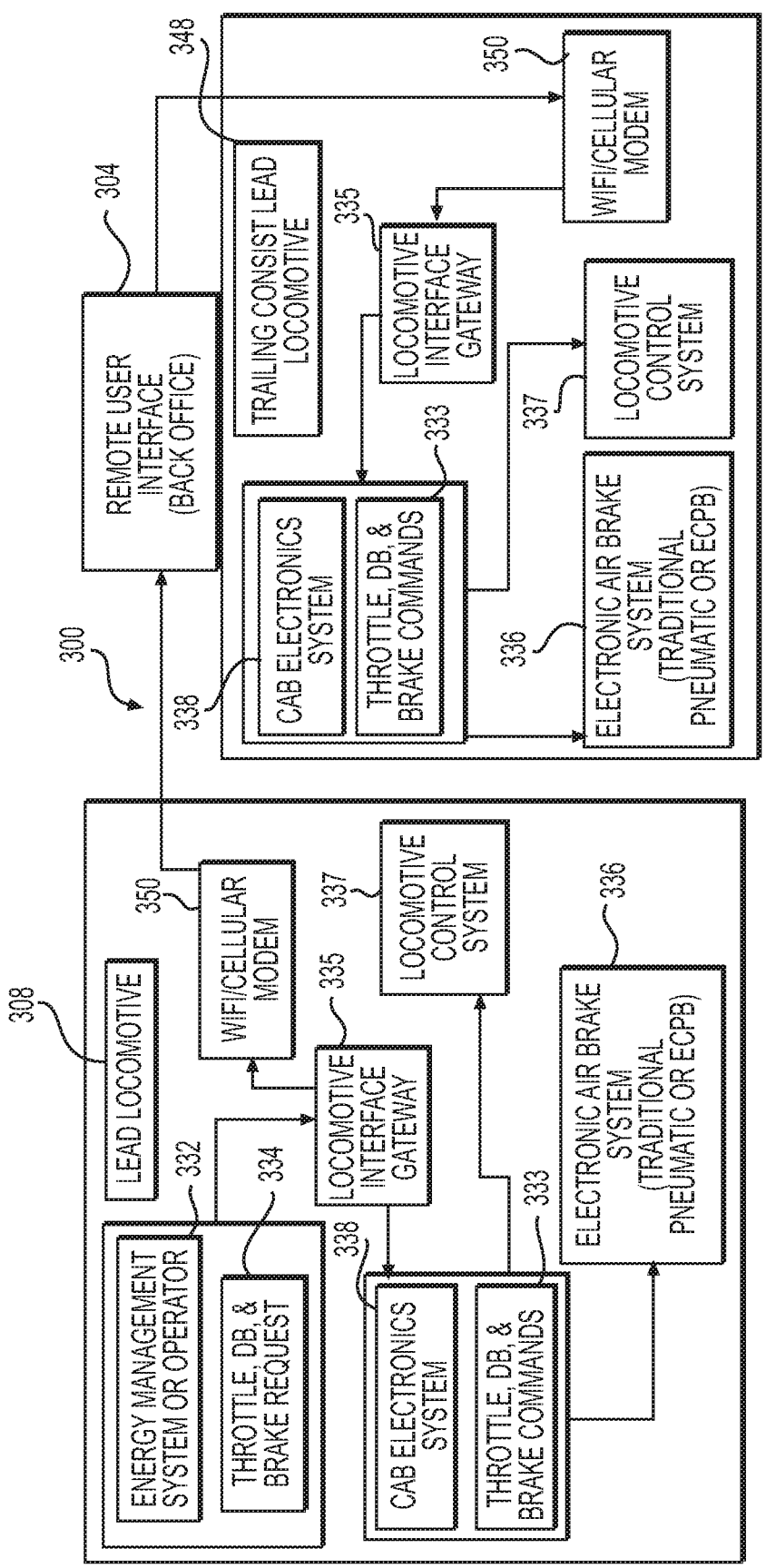
FIG. 3 is a block diagram of one implementation of a portion of the control system illustrated in FIG. 1.

As further shown in FIG. 3, on-board controls may include an energy management system 332 configured to determine, e.g., one or more of throttle requests, dynamic braking requests, and pneumatic braking requests 334 for one or more of the powered and non-powered units of the train. The energy management system 332 may be configured to make these various requests based on a variety of measured operational parameters, track conditions, freight loads, trip plans, and predetermined maps or other stored data with one or more goals of improving availability of train assets, safety, timeliness, overall fuel economy and emissions output for individual powered units, consists, or the entire train. The cab of the lead powered unit 308 in each of the consists may also house a plurality of operational control devices, and control system interfaces. The operational control devices may be used by an operator to manually control the locomotive, or may be controlled electronically via messages received from off-board the train. Operational control devices may include, among other things, an engine run/isolation switch, a generator field switch, an automatic brake handle, an independent brake handle, a lockout device, and any number of circuit breakers. Manual input devices may include switches, levers, pedals, wheels, knobs, push-pull devices, touch screen displays, etc.

Operation of the engines, generators, inverters, converters, and other auxiliary devices may be at least partially controlled by switches or other operational control devices that may be manually movable between a run or activated state and an isolation or deactivated state by an operator of the train 102. The operational control devices may be additionally or alternatively activated and deactivated by solenoid actuators or other electrical, electromechanical, or electrohydraulic devices. As one example, a toggling device associated with an engine (not shown) may be manually and/or autonomously moved to a run state, in which the engine may be allowed to start in response to a command generated from on-board the train 102, or in response to a command received from the off-board remote user interface 304. The toggling device may also be moved to an isolation state, in which the engine may be shutdown (i.e., turned off) and not allowed to restart. In one embodiment, moving the toggling device to the run state causes startup of the engine and, likewise, moving the toggling device to the isolation state causes the engine to shut down. In another embodiment, moving the toggling device to the run state simply allows subsequent startup of the engine using other input devices, and the toggling device is only moved to the isolation state after engine shutdown to inhibit restart of the engine. In either scenario, the engine may not be restarted from on-board the train while the toggling device is in the isolation state. The operator of the locomotive may manually move the toggling device to the run state at the start of a work shift or trip, and move the toggling device to the isolation position at the end of the work shift or trip. The off-board remote user interface 304 may also require compliance with security protocols to ensure that only designated personnel may remotely activate or deactivate operational control devices on-board the train from the off-board remote user interface 304 after certain prerequisite conditions have been met. The off-board remote user interface may include various security algorithms or other means of comparing an operator authorization input with a predefined security authorization parameter or level. The security algorithms may also establish restrictions or limitations on controls that may be performed based on the location of a locomotive, authorization of an operator, and other parameters.

Circuit breakers may be associated with particular components or subsystems of a locomotive on the train 102, and configured to trip when operating parameters associated with the components or subsystems deviate from expected or predetermined ranges. For example, circuit breakers may be associated with power directed to individual traction motors, HVAC components, and lighting or other electrical components, circuits, or subsystems. When a power draw greater than an expected draw occurs, the associated circuit breaker may trip, or switch from a first state to a second state, to interrupt the corresponding circuit. In some implementations of this disclosure, a circuit breaker may be associated with an on-board control system or communication unit that controls wireless communication with the off-board remote user interface 304. After a particular circuit breaker trips, the associated component or subsystem may be disconnected from the main electrical circuit of the locomotive 308 and remain nonfunctional until the corresponding breaker is reset. The circuit breakers may be manually tripped or reset. Alternatively or in addition, the circuit breakers may include actuators or other control devices that can be selectively energized to autonomously or remotely switch the state of the associated circuit breakers in response to a corresponding command received from the off-board remote user interface 304. In some embodiments, a maintenance signal may be transmitted to the off-board remote user interface 304 upon switching of a circuit breaker from a first state to a second state, thereby indicating that action such as a reset of the circuit breaker may be needed.

As shown in FIG. 3, an exemplary control system 300 according to this disclosure may further include a microprocessor-based locomotive control system 337 having at least one programmable logic controller (PLC), a cab electronics system 338, and an electronic air (pneumatic) brake system 336, all mounted within a cab of the locomotive. The cab electronics system 338 may comprise at least one integrated display computer configured to receive and display data from the outputs of one or more of machine gauges, indicators, sensors, and controls. The cab electronics system 338 may be configured to process and integrate the received data, receive command signals from the off-board remote user interface 304, and communicate commands such as throttle, dynamic braking, and pneumatic braking commands 333 to the microprocessor-based locomotive control system 337.

The microprocessor-based locomotive control system 337 may be communicatively coupled with the traction motors, engines, generators, braking subsystems, input devices, actuators, circuit breakers, and other devices and hardware used to control operation of various components and subsystems on the locomotive. In various alternative implementations of this disclosure, some operating commands, such as throttle and dynamic braking commands, may be communicated from the cab electronics system 338 to the locomotive control system 337, and other operating commands, such as braking commands, may be communicated from the cab electronics system 338 to a separate electronic air brake system 336. One of ordinary skill in the art will recognize that the various functions performed by the locomotive control system 337 and electronic air brake system 336 may be performed by one or more processing modules or controllers through the use of hardware, software, firmware, or various combinations thereof. Examples of the types of controls that may be performed by the locomotive control system 337 may include radar-based wheel slip control for improved adhesion, automatic engine start stop (AESS) for improved fuel economy, control of the lengths of time at which traction motors are operated at temperatures above a predetermined threshold, control of generators/alternators, control of inverters/converters, the amount of exhaust gas recirculation (EGR) and other exhaust aftertreatment processes performed based on detected levels of certain pollutants, and other controls performed to improve safety, increase overall fuel economy, reduce overall emission levels, and increase longevity and availability of the locomotives. The at least one PLC of the locomotive control system 337 may also be configurable to selectively set predetermined ranges or thresholds for monitoring operating parameters of various subsystems. When a component detects that an operating parameter has deviated from the predetermined range, or has crossed a predetermined threshold, a maintenance signal may be communicated off-board to the remote user interface 304. The at least one PLC of the locomotive control system 337 may also be configurable to receive one or more command signals indicative of at least one of a throttle command, a dynamic braking readiness command, and an air brake command 333, and output one or more corresponding command control signals configured to at least one of change a throttle position, activate or deactivate dynamic braking, and apply or release a pneumatic brake, respectively.

The cab electronics system 338 may provide integrated computer processing and display capabilities on-board the train 102, and may be communicatively coupled with a plurality of cab gauges, indicators, and sensors, as well as being configured to receive commands from the remote user interface 304. The cab electronics system 338 may be configured to process outputs from one or more of the gauges, indicators, and sensors, and supply commands to the locomotive control system 337. In various implementations, the remote user interface 304 may comprise a laptop, hand-held device, or other computing device or server with software, encryption capabilities, and Internet access for communicating with the on-board controller of the lead locomotive 308 of a lead consist and on-board controllers of any other lead or trailing locomotives, such as trailing locomotive 110 in the lead consist 114 of FIG. 1, remote lead locomotive 348 in a trailing consist of FIG. 3, and trailing locomotive 150 in the trailing consist 140 of FIG. 1. Control commands generated by the cab electronics system 338 on the lead locomotive 308 of the lead consist may be communicated to the locomotive control system 337 of the lead locomotive of the lead consist, and may be communicated in parallel via a locomotive interface gateway (LIG) 335, and a WiFi/cellular modem 350 off-board to the remote user interface 304. The lead communication unit 120 on-board the lead locomotive 308 of the lead consist may include the WiFi/cellular modem 350 and any other communication equipment required to modulate and transmit the command signals off-board the locomotive and receive command signals on-board the locomotive.

The control systems and interfaces on-board and off-board the train may embody single or multiple microprocessors, field programmable gate arrays (FPGAs), digital signal processors (DSPs), programmable logic controllers (PLCs), etc., that include means for controlling operations of the train 102 in response to operator requests, built-in constraints, sensed operational parameters, and/or communicated instructions from the remote user interface 304. Numerous commercially available microprocessors can be configured to perform the functions of these components. Various known circuits may be associated with these components, including power supply circuitry, signal-conditioning circuitry, actuator driver circuitry (i.e., circuitry powering solenoids, motors, or piezo actuators), and communication circuitry.

The locomotives 108, 110, 148, 150, 308, 348 may be outfitted with any number and type of sensors known in the art for generating signals indicative of associated operating parameters. In one example, a locomotive may include a temperature sensor configured to generate a signal indicative of a coolant temperature of an engine on-board the locomotive. Additionally or alternatively, sensors may include brake temperature sensors, exhaust sensors, fuel level sensors, pressure sensors, knock sensors, reductant level or temperature sensors, speed sensors, motion detection sensors, location sensors, or any other sensor known in the art. The signals generated by the sensors may be directed to the cab electronics system 338 on each locomotive for further processing and generation of appropriate commands.

Any number and type of warning devices may also be located on-board each locomotive, including an audible warning device and/or a visual warning device. Warning devices may be used to alert an operator on-board a locomotive of an impending operation, for example startup of the engine(s). Warning devices may be triggered manually from on-board the locomotive (e.g., in response to movement of a component to the run state) and/or remotely from off-board the locomotive (e.g., in response to commands from the remote user interface 304.) When triggered from off-board the locomotive, a corresponding command signal used to initiate operation of the warning device may be communicated to the on-board controller and the cab electronics system 338.

The off-board remote user interface 304 may include any means for monitoring, recording, storing, indexing, processing, and/or communicating various operational aspects of the locomotives. These means may include components such as, for example, a memory, one or more data storage devices, a central processing unit, or any other computing components that may be used to run an application. Furthermore, although aspects of the present disclosure may be described generally as being stored in memory, one skilled in the art will appreciate that these aspects can be stored on or read from different types of computer program products or non-transitory computer-readable media such as computer chips and secondary storage devices, including hard disks, floppy disks, optical media, CD-ROM, or other forms of RAM or ROM.

The off-board remote user interface 304 may be configured to execute instructions stored on computer readable media to perform methods of remote control of a locomotive. That is, as will be described in more detail in the following section, on-board control (manual and/or autonomous control) of some operations of the locomotive (e.g., operations of traction motors, engine(s), circuit breakers, etc.) may be selectively overridden by inputs received from the off-board remote user interface 304.

Remote control of the various powered and non-powered units on the train 102 through communication between the on-board cab electronics system 338 and the off-board remote user interface 304 may be facilitated via the various communication units 120, 126, 160, 166 spaced along the train 102. The communication units may include hardware and/or software that enables sending and receiving of data messages between the powered units of the train and the off-board remote user interface. The data messages may be sent and received via a direct data link and/or a wireless communication link, as desired. The direct data link may include an Ethernet connection, a connected area network (CAN), or another data link known in the art. The wireless communications may include satellite, cellular, infrared, and any other type of wireless communications that enable the communication units to exchange information between the off-board remote user interface 304 and the various components and subsystems of each of the locomotives or other powered units in the train 102.

As shown in the exemplary embodiment of FIG. 3, the on-board control system of the lead locomotive 308 of a lead consist may comprise an automatic train operation (ATO) system that may include the energy management system 332 configured to provide throttle requests, dynamic braking requests, and pneumatic braking requests 334 to help regulate movements and/or operations of the various subsystems of the lead locomotive 308 (e.g., direct operations of associated traction motors, engines, alternators, circuit breakers, etc.). The on-board ATO system of the lead locomotive 308 may also include the cab electronics system 338 configured to receive the requests 334 from the energy management system 332 as well as commands from the off-board remote user interface 304.

As further shown in FIG. 3, the cab electronics system 338 may be configured to receive the requests 334 from the energy management system 332 via the locomotive interface gateway (LIG) 335, and commands received via the LIG 335 from a WiFi/cellular modem 350 that receives commands from the off-board remote user interface (back office) 304. The cab electronics system 338 may be configured to communicate commands (e.g., throttle, dynamic braking, and braking commands 333) to the locomotive control system 337 and an electronic air brake system 336 on-board the lead locomotive 308 in order to autonomously control the movements and/or operations of the lead locomotive.

In parallel with communicating commands to the locomotive control system 337 of the lead locomotive 308, the cab electronics system 338 on-board the lead locomotive 308 of the lead consist may also communicate commands to the off-board remote user interface 304. The commands may be communicated via the LIG 335 and WiFi/cellular modem 350, off-board the lead locomotive 308 of the lead consist to the remote user interface 304. The remote user interface 304 may communicate commands originated at the remote user interface 304, or commands received from the lead locomotive 308 to the trailing consist lead locomotive 348, and the trailing consist trailing locomotive 150. The commands may be received at each of the locomotives via additional WiFi/cellular modems on-board each locomotive, and communicated to a cab electronics system on-board each locomotive. The cab electronics systems on-board each locomotive may be configured to communicate the commands received from the lead locomotive 308 of the lead consist via the remote user interface 304, or commands that originated at the remote user interface 304 to a locomotive control system and an electronic air brake system on-board each locomotive. The commands from the lead locomotive 308 of the lead consist via the remote user interface, or directly from the remote user interface may also be communicated via the network connection 118 from the trailing consist lead locomotive 348 to one or more trailing locomotives 150 of the trailing consists. The result of configuring all of the locomotives of the lead and trailing consists to communicate directly with the off-board remote user interface 204 is that each locomotive may respond quickly and in close coordination with commands responded to by other locomotives in the train. Additionally, each of the locomotives in various consists along a long train may quickly and reliably receive commands such as throttle, dynamic braking, and pneumatic braking commands 233 initiated by a lead locomotive in a lead consist regardless of location and conditions.

The integrated cab electronics systems 338 on each of the locomotives of the train may also be configured to receive and generate commands for configuring or reconfiguring various switches, handles, or other operational control devices on-board each of the locomotives of the train as required before the train begins on a journey, or after a failure occurs that requires reconfiguring of all or some of the locomotives. The remote user interface may allow any authorized user at a remote location to view the status of various operational attributes of the locomotive, and provide commands for changing the designation of any locomotive to lead status, changing to or from distributed power mode, and making other desired changes to the operational status and attributes of each of the locomotives. A configuration failure signal may be sent automatically from any one of the locomotives on the train to the off-board remote user interface 304 after a failure or prior to starting or restarting of the train. Alternatively or in addition, the configuration failure signal may be provided to the off-board remote user interface as a manual input from an operator. The configuration failure signal may be indicative of one or more operational control devices on-board the locomotive being in a position that is moved away from a run configuration. A "run configuration" of an operational control device, as used herein, refers to the proper configuration of the device before the locomotive is ready to safely move away from a stopped position. The configuration failure signal may inform the remote user interface 304 that configuring or reconfiguring of an operational control device to a run configuration may be required before the locomotive will be ready to travel.

Dispatch personnel may log into the remote user interface 304 upon receiving the configuration failure signal or other alert or notification that reconfiguring of one or more of the locomotives is required. Alternatively or in addition, an operator may be aware of a need to reconfigure a locomotive based upon personal observation or other information. "Configuring" or "reconfiguring" a locomotive, as used herein, may refer to all of the actions that are taken before the locomotive is ready for travel. Configuration command signals may be transmitted from the remote user interface 304 to any locomotive on the train. A configuration command signal may cause automatic reconfiguration of each of the required switches, handles, and other operational control devices on-board a locomotive into a run configuration after a train has been stopped, or after a critical failure has occurred. Multiple settings for a locomotive may be changed through activation of a single button on the remote user interface. Examples of operational control devices such as switches and handles that may require configuring or reconfiguring before a journey or after a failure may include an engine run switch, a generator field switch, an automatic brake handle, and an independent brake handle. Remotely controlled, electronically controlled actuators on-board the locomotives in association with each of the switches and handles may enable remote, autonomous reconfiguring of each of the operational control devices into a run configuration. For example, before the train begins a journey, or after a critical failure has occurred on one of the lead or trailing locomotives, configuration command signals may be sent from the off-board remote user interface 304 to any or all locomotives in order to automatically reconfigure operational control devices into run configurations without requiring an operator to be on-board the train. Following the reconfiguration of each of the various operational control devices on-board each locomotive into a run configuration, the remote user interface 304 may also send messages to the cab electronics systems on-board each locomotive appropriate for generating other operational commands such as changing throttle settings, activating or deactivating dynamic braking, and applying or releasing pneumatic brakes. In various alternative implementations, configuration command signals and other messages from the off-board remote user interface may be communicated wirelessly to a lead locomotive in a consist, and then communicated from the lead locomotive over a wired connection such as the network connection 118 to one or more trailing locomotives in the consist. This capability saves the time and expense of having to delay the train before starting or after an event while sending an operator to each of the locomotives on the train to physically switch and reconfigure all of the devices required.

An exemplary method of configuring a locomotive in a train in accordance with various aspects of this disclosure is described in more detail in the following section.

INDUSTRIAL APPLICABILITY

The control system of the present disclosure may be applicable to any group of locomotives or other powered machines where remote access to particular functions of the machines may be desirable. These functions may normally be controlled manually from on-board each locomotive, and remote access to these functions may provide a way to enable automatic train operation (ATO) when human operators are not present or available at the locomotives. An exemplary implementation of one mode of operation of the control system 300 shown in the embodiment of FIG. 3 will now be described in detail.

During normal operation, a human operator may be located on-board the lead locomotive 308 and within the cab of the locomotive. The human operator may be able to control when an engine or other subsystem of the train is started or shut down, which traction motors are used to propel the locomotive, what switches, handles, and other operational control devices are reconfigured, and when and what circuit breakers are reset or tripped. The human operator may also be required to monitor multiple gauges, indicators, sensors, and alerts while making determinations on what controls should be initiated. However, there may be times when the operator is not available to perform these functions, when the operator is not on-board the locomotive 308, and/or when the operator is not sufficiently trained or alert to perform these functions. In addition, the control system 300 in accordance with this disclosure facilitates remote access to and availability of the locomotives in a train for authorized third parties, including providing redundancy and reliability of monitoring and control of the locomotives and subsystems on-board the locomotives.

A method of controlling locomotives in lead and trailing consists of a train in accordance with various aspects of this disclosure may include receiving an automatic or manually generated configuration signal indicative of a position of an operational control device on a locomotive at the off-board remote user interface 304. The configuration signal may be indicative of a situation at one or more of the locomotives in the train requiring configuration or reconfiguration of various operational control devices on-board the one or more locomotives. Dispatch personnel may then initiate the transmission of a configuration command signal from the remote user interface 304 directly to the one or more locomotives requiring reconfiguration. In this way, all of the locomotives in the lead and trailing consists of the train may be reconfigured in parallel without requiring an operator on-board the train. The configuration commands signals, like other messages communicated from the remote user interface 304, may also be transmitted only to a lead locomotive in a consist, and then communicated over a wired connection such as the network connection 118 to one or more trailing locomotives in the consist. As discussed above, on-board controls of the locomotives in the train may also include the energy management system 332 providing one or more of throttle, dynamic braking, or braking requests 334 to the cab electronics system 338. The cab electronics system 338 may process and integrate these requests along with other outputs from various gauges and sensors, and commands such as the configuration command that may have been received from the off-board remote user interface 304. The cab electronics system 338 may then communicate multiple commands to the on-board locomotive control system 337. In parallel with these on-board communications, the cab electronics system 338 may communicate commands via a LIG 335 and a WiFi/cellular modem 350 back to the off-board remote user interface 304. In various alternative implementations, the off-board remote user interface 304 may further process the commands received from the lead locomotive 308 of the lead consist in order to modify the commands or otherwise interpret the commands before transmitting commands to the other locomotives. Modification of the commands may be based on additional information the remote user interface 304 has acquired from one or more locomotives, trip plans, and information from maps or other stored data. The commands transmitted from the remote user interface 304 by dispatch personnel may be received from the remote user interface 304 in parallel at each of the locomotives of multiple trailing consists.

In addition to throttle, dynamic braking, and braking commands, the remote user interface 304 may also communicate other commands to the cab electronics systems 338 of the on-board controllers on one or more locomotives in multiple consists. These commands may include switching a component such as a circuit breaker on-board a locomotive from a first state, in which the circuit breaker has not tripped, to a second state, in which the circuit breaker has tripped. The circuit breaker may be tripped in response to detection that an operating parameter of at least one component or subsystem of the locomotive has deviated from a predetermined range. When such a deviation occurs, a maintenance signal may be transmitted from the locomotive to the off-board remote user interface 304. The maintenance signal may be indicative of a subsystem having deviated from the predetermined range as indicated by a circuit breaker having switched from a first state to a second state. The method may further include selectively receiving a command signal from the remote user interface 304 at a control device on-board the locomotive, with the command signal causing the control device to autonomously switch the component from the second state back to the first state. In the case of a tripped circuit breaker, the command may result in resetting the circuit breaker.

The method of remotely controlling the locomotives in various consists of a train may also include configuring one or more programmable logic controllers (PLC) of microprocessor-based locomotive control systems 337 on-board one or more locomotives to selectively set predetermined ranges for operating parameters associated with various components or subsystems. In one exemplary implementation, a locomotive control system 337 may determine that a circuit of a particular subsystem of the associated locomotive is operating properly when the current flowing through the circuit falls within a particular range. A circuit breaker may be associated with the circuit and configured to trip when the current flowing through the circuit deviates from the determined range. In another exemplary implementation, the locomotive control system may determine that a particular flow rate of exhaust gas recirculation (EGR), or flow rate of a reductant used in exhaust gas aftertreatment, is required in order to meet particular fuel economy and/or emission levels. A valve and/or pump regulating the flow rate of exhaust gas recirculation and/or reductant may be controlled by the locomotive control system 337 when a level of a particular pollutant deviates from a predetermined range. The predetermined ranges for various operating parameters may vary from one locomotive to another based on specific characteristics associated with each locomotive, including age, model, location, weather conditions, type of propulsion system, fuel efficiency, type of fuel, and the like.

The method of controlling locomotives in a train in accordance with various implementations of this disclosure may still further include a cab electronics system 338 on-board a locomotive receiving and processing data outputs from one or more of gauges, indicators, sensors, and controls on-board the locomotive. The cab electronics system 338 may also receive and process, e.g., throttle, dynamic braking, and pneumatic braking requests from the energy management system 332 and/or human operator on-board the locomotive, and command signals from the off-board remote user interface 304. The cab electronics system 338 may then communicate appropriate commands to the locomotive control system 337 and/or electronic air brake system 336 based on the requests, data outputs and command signals. The locomotive control system 337 may perform various control operations such as reconfiguring operational control devices, resetting circuit breakers, adjusting throttle settings, activating dynamic braking, and activating pneumatic braking in accordance with the commands received from the cab electronics system 338. The locomotive control system 337 may perform the control operations by sending command signals to hardware such as electronically controlled actuators or electrohydraulic actuators associated with the operational control devices, circuit breakers, and other components.

It will be apparent to those skilled in the art that various modifications and variations can be made to the control system and method of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A control system for a train, wherein the train comprises at least a lead consist of locomotives including at least a lead locomotive and a trailing locomotive, and a trailing consist of locomotives including at least a lead locomotive and a trailing locomotive; the control system comprising:
   a plurality of operational control devices located on-board at least one of the locomotives, wherein the plurality of operational control devices may be configured to change a configuration setting for the at least one locomotive when the at least one locomotive is ready for travel;
   an on-board controller located on-board the at least one locomotive, the on-board controller being configured to switch the plurality of operational control devices upon receipt of a single configuration command signal to at least one of:
      set the at least one locomotive into a run configuration;
      change the designation for the at least one locomotive between lead and trailing designations; and
      change distributed power control for the at least one locomotive between distributed power lead, remote distributed power lead, and unlinked power, wherein:
         setting the at least one locomotive into a run configuration, changing the designation of the at least one locomotive, and changing distributed power control each include changing multiple operational control settings as a result of the single configuration command signal, wherein the multiple settings that are changed include at least two of:
            a fuel control setting, a traction control setting, a generator setting, a setting of an automatic brake handle, a setting of an independent brake handle, a setting of an electrically controlled pneumatic brake, and a setting of an equalizing reservoir pressure for air brakes; and
      an off-board remote user interface located remotely from the train, the off-board remote user interface being configured to send the single configuration command signal upon activation of a single input on the remote user interface.

2. The control system of claim 1, wherein the on-board controller comprises:
   a locomotive control system; and
   a cab electronics system comprising at least one integrated display computer configured to:
      receive and display data from the outputs of one or more of machine gauges, indicators, sensors, and controls;
      process and integrate the received data;
      receive the configuration command signal from the off-board remote user interface; and
      supply multiple commands based on the data and the configuration command signal to the locomotive control system; and
   the on-board controller being in wireless communication with the off-board remote user interface.

3. The control system of claim 1, wherein the off-board remote user interface is configured to at least one of send the configuration command signal automatically to the on-board controller upon detection of a change in configuration of at least one of the plurality of operational control devices, or manually as a result of an operator input at the off-board remote user interface.

4. The control system of claim 1, wherein the operational control device is at least one of a switch and a handle.

5. The control system of claim 4, wherein the operational control device is at least one of an engine run switch, a generator field switch, an automatic brake handle, and an independent brake handle.

6. The control system of claim 2, wherein at least one of the plurality of operational control devices is configured to be activated by an electronically controlled actuator controlled by the locomotive control system.

7. The control system of claim 2, further including:
   the off-board remote user interface being configured to send a plurality of configuration command signals in parallel to a plurality of cab electronics systems on-board a plurality of locomotives in the lead and trailing consists based on at least one of receiving an input from a user at the off-board remote user interface or detecting an operational control device on-board at least one of the plurality of locomotives implementing a change to a designated configuration of the at least one locomotive.

8. The control system of claim 7, wherein at least one of the plurality of cab electronics systems on-board at least one of the trailing locomotives in at least one of the lead and trailing consists is configured to receive at least one of the plurality of configuration command signals from the off-board remote user interface via a wired network connection with the lead locomotive in the same consist.

9. The control system of claim 2, wherein the locomotive control system is configurable to receive one or more signals indicative of at least one of a throttle command, dynamic braking readiness, and a brake command, and output one or more corresponding command signals configured to change at least one of a throttle position for the locomotive, activation of dynamic braking, and application of a brake, respectively.

10. A method of configuring a locomotive, comprising:
selectively configuring a plurality of operational control devices located on-board the locomotive to change a configuration setting for the locomotive when the locomotive is ready for travel;
selectively configuring the plurality of operational control devices upon receipt of a single configuration command signal by an on-board controller located on-board the locomotive, wherein the plurality of operational control devices may be switched by the single configuration command signal to at least one of:
set the locomotive into a run configuration;
change the designation for the locomotive between lead and trailing designations; and
change distributed power control for the locomotive between distributed power lead, remote distributed power lead, and unlinked power, wherein:
setting the at least one locomotive into a run configuration, changing the designation of the at least one locomotive, and changing distributed power control each include changing multiple operational control settings as a result of the single configuration command signal, wherein the multiple settings that are changed include at least two of:
a fuel control setting, a traction control setting, a generator setting, a setting of an automatic brake handle, a setting of an independent brake handle, a setting of an electrically controlled pneumatic brake, and a setting of an equalizing reservoir pressure for air brakes; and
sending the single configuration command signal from an off-board remote user interface located remotely from the locomotive upon activation of a single input on the remote user interface.

11. The method of claim 10, further including:
receiving data from the outputs of one or more of machine gauges, indicators, sensors, and controls at a cab electronics system of the on-board controller;
processing and integrating the received data;
receiving the configuration command signal from the off-board remote user interface at the cab electronics system;
supplying multiple commands based on the received data and the configuration command signal to the locomotive control system; and
controlling an electronically controlled actuator with the locomotive control system to selectively configure at least one of the plurality of operational control devices.

12. A control system for a train, wherein the train comprises at least a lead consist of locomotives including at least a lead locomotive and a trailing locomotive, and a trailing consist of locomotives including at least a lead locomotive and a trailing locomotive; the control system comprising:
a plurality of operational control devices located on-board at least one of the locomotives, wherein the plurality of operational control devices may be configured to change a configuration setting for the at least one locomotive when the at least one locomotive is ready for travel;
an on-board controller located on-board the at least one locomotive, the on-board controller being configured to switch the plurality of operational control devices upon receipt of a single configuration command signal to at least one of:
set the at least one locomotive into a run configuration;
change the designation for the at least one locomotive between lead and trailing designations; and
change distributed power control for the at least one locomotive between distributed power lead, remote distributed power lead, and unlinked power, wherein:
setting the at least one locomotive into a run configuration, changing the designation of the at least one locomotive, and changing distributed power control each include changing multiple operational control settings as a result of the single configuration command signal, wherein the multiple settings that are changed include at least two of:
a fuel control setting, a traction control setting, a generator setting, a setting of an automatic brake handle, a setting of an independent brake handle, a setting of an electrically controlled pneumatic brake, and a setting of an equalizing reservoir pressure for air brakes.

13. The control system of claim 12, wherein the on-board controller comprises:
a locomotive control system; and
a cab electronics system comprising at least one integrated display computer configured to:
receive and display data from the outputs of one or more of machine gauges, indicators, sensors, and controls;
process and integrate the received data;
receive the configuration command signal from an off-board remote user interface; and
supply multiple commands based on the data and the configuration command signal to the locomotive control system; and
the on-board controller being in wireless communication with an off-board remote user interface.

14. The control system of claim 13, wherein the off-board remote user interface is configured to at least one of send the configuration command signal automatically to the on-board controller upon detection of a change in configuration of at least one of the plurality of operational control devices, or manually as a result of an operator input at the off-board remote user interface.

15. The control system of claim 12, wherein at least one of the plurality of operational control devices is a switch or a handle.

16. The control system of claim 12, wherein at least one of the plurality of operational control devices is an engine run switch, a generator field switch, an automatic brake handle, or an independent brake handle.

17. The control system of claim 13, wherein at least one of the plurality of operational control devices is configured to be activated by an electronically controlled actuator controlled by the locomotive control system.

18. The control system of claim 13, further including:
the off-board remote user interface being configured to send a plurality of configuration command signals in parallel to a plurality of cab electronics systems on-board a plurality of locomotives in the lead and trailing consists based on at least one of receiving an input from a user at the off-board remote user interface or detecting an operational control device on-board at least one of the plurality of locomotives implementing a change to a designated configuration of the at least one locomotive.

19. The control system of claim 18, wherein at least one of the plurality of cab electronics systems on-board at least one of the trailing locomotives in at least one of the lead and trailing consists is configured to receive at least one of the plurality of configuration command signals from the off-board remote user interface via a wired network connection with the lead locomotive in the same consist.

20. The control system of claim 13, wherein the locomotive control system is configurable to receive one or more signals indicative of at least one of a throttle command, dynamic braking readiness, and a brake command, and output one or more corresponding command signals configured to change at least one of a throttle position for the locomotive, activation of dynamic braking, and application of a brake, respectively.

* * * * *